(12) United States Patent
Zielinsky

(10) Patent No.: US 8,087,710 B2
(45) Date of Patent: Jan. 3, 2012

(54) MULTI-POSITION TAILGATE SUPPORT APPARATUS AND METHOD

(76) Inventor: Cary R. Zielinsky, Liberty, UT (US)

( * ) Notice: Subject to any disclaimer, the term of this patent is extended or adjusted under 35 U.S.C. 154(b) by 51 days.

(21) Appl. No.: 12/692,463

(22) Filed: Jan. 22, 2010

(65) Prior Publication Data
US 2011/0181068 A1    Jul. 28, 2011

(51) Int. Cl.
E05C 17/36    (2006.01)
B60J 5/10    (2006.01)

(52) U.S. Cl. ............................ 296/57.1; 296/106; 16/82

(58) Field of Classification Search .................. 296/50, 296/57.1, 180.5, 146.8, 106; 16/82; 24/298–302
See application file for complete search history.

(56) References Cited

U.S. PATENT DOCUMENTS

| | | | | |
|---|---|---|---|---|
| 5,645,310 A | * | 7/1997 | McLaughlin | 296/180.5 |
| 5,934,727 A | * | 8/1999 | Storc et al. | 296/26.11 |
| 6,607,232 B2 | * | 8/2003 | Katulka | 296/57.1 |
| 2003/0116991 A1 | * | 6/2003 | Katulka | 296/57.1 |

* cited by examiner

*Primary Examiner* — Glenn Dayoan
*Assistant Examiner* — Gregory Blankenship
(74) *Attorney, Agent, or Firm* — Warren M. Pate, LLC

(57) ABSTRACT

A method and apparatus for adjusting the location of suspension for a tailgate is disclosed. The method may include selecting a vehicle comprising first and second sides, a tailgate, and at least one tailgate support. The tailgate may be connected to pivot with respect to the first and second sides through a range of motion. The at least one tailgate support may have a base and an array pivotably connected to the base. The base may engage the tailgate. The array may engage the first side and comprise first and second engagement mechanisms. The method may further include disengaging the first engagement mechanism from the first side, pivoting the array with respect to the base, and effecting an engagement between the second engagement mechanism and the first side. By switching from the first engagement mechanism to the second engagement mechanism, the location of suspension for the tailgate may be adjusted.

19 Claims, 18 Drawing Sheets

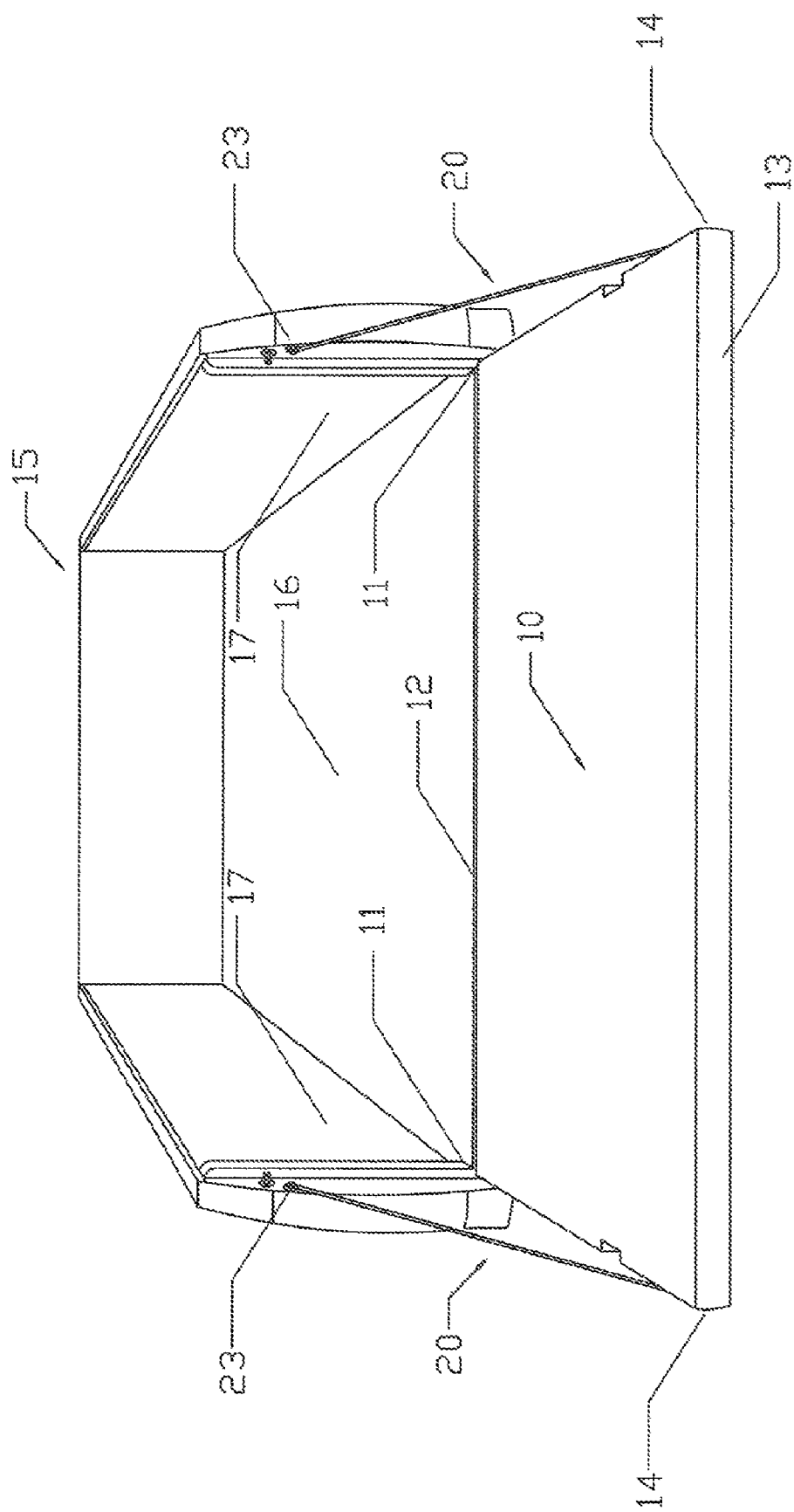

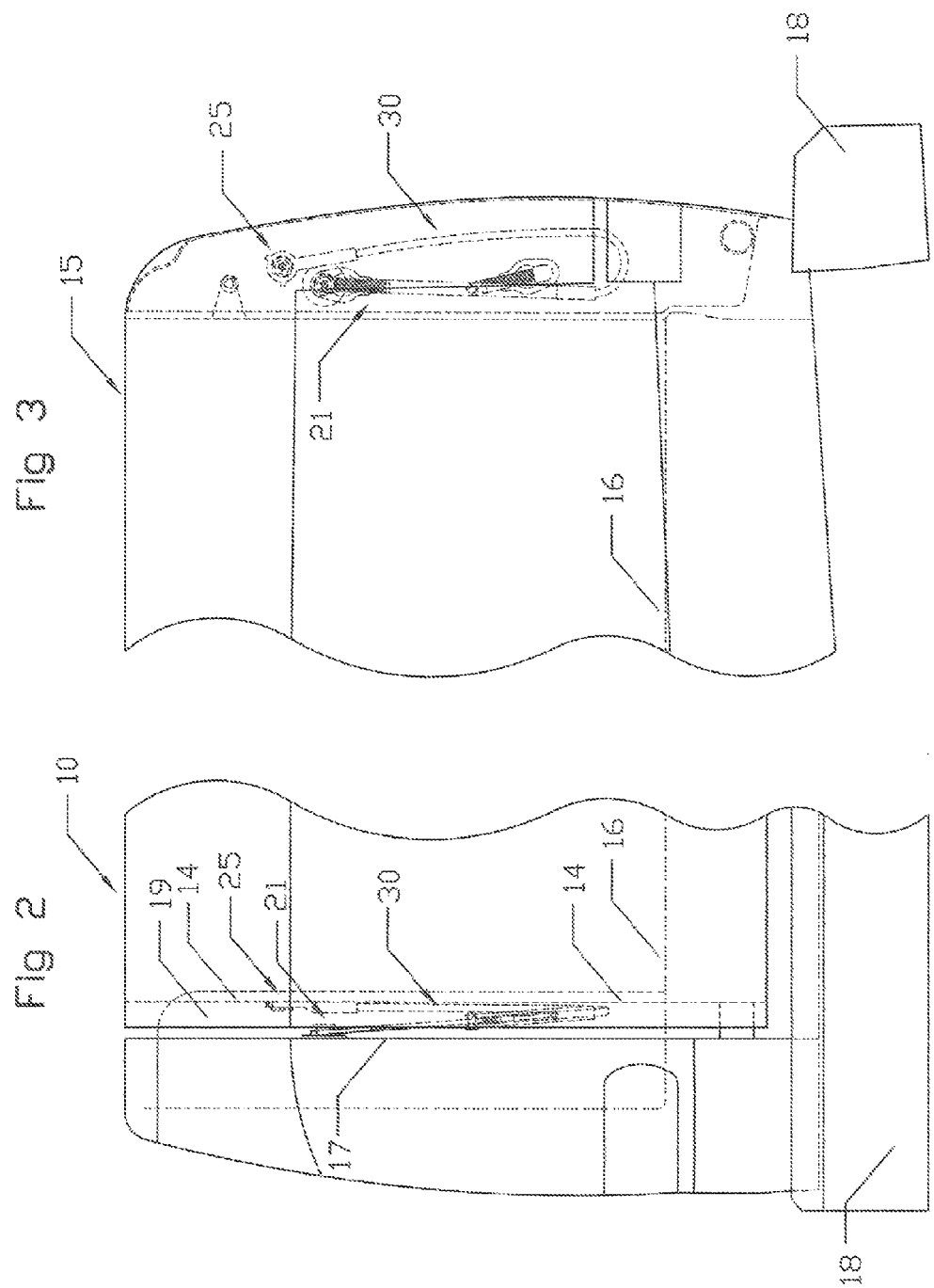

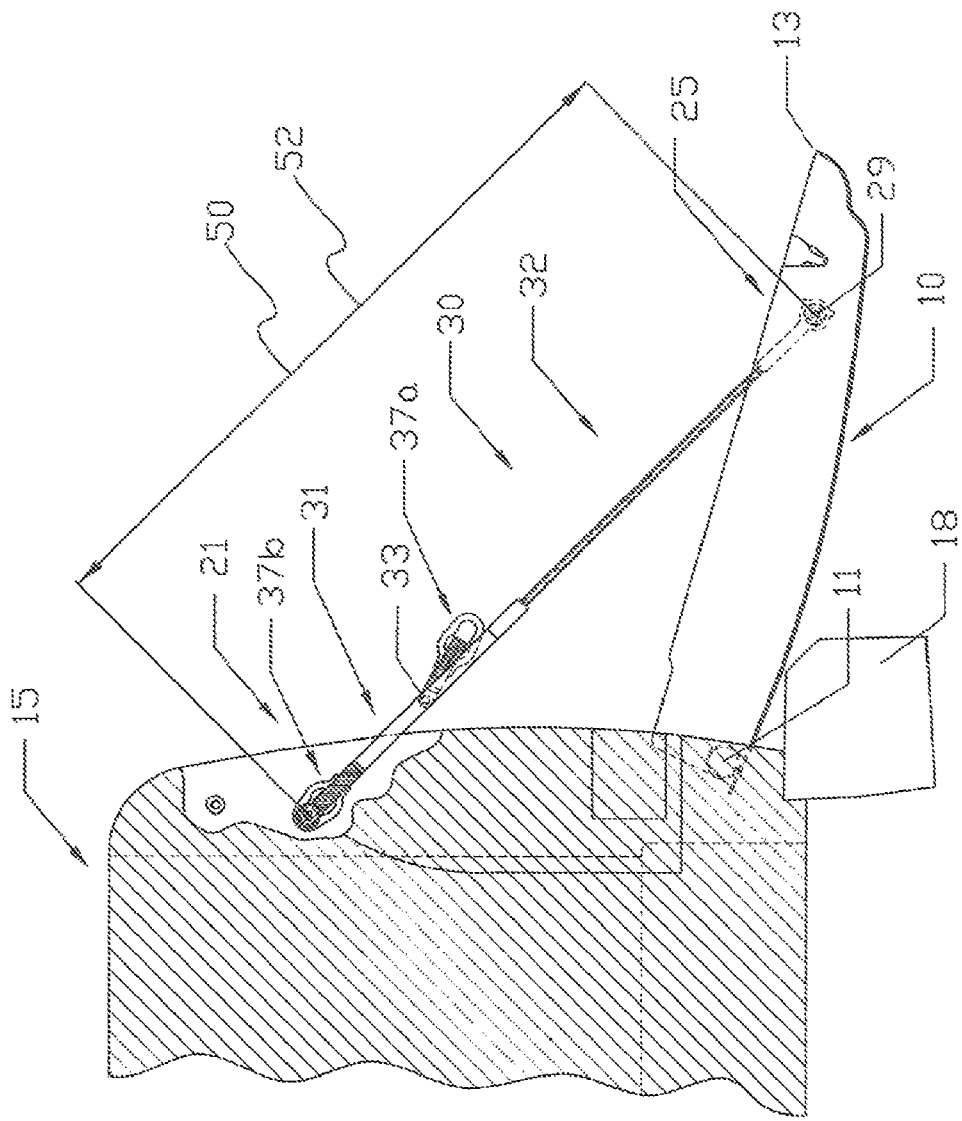

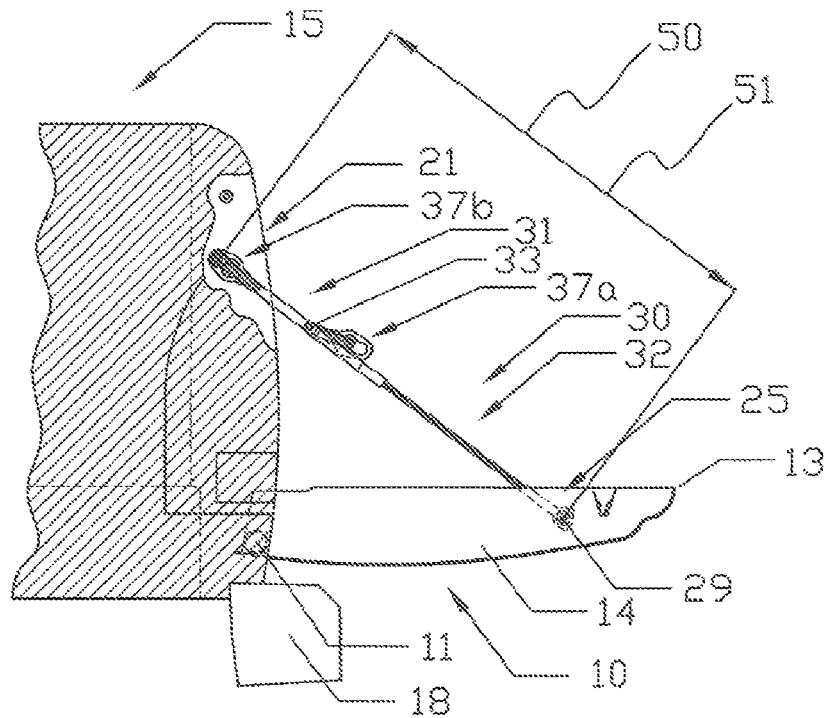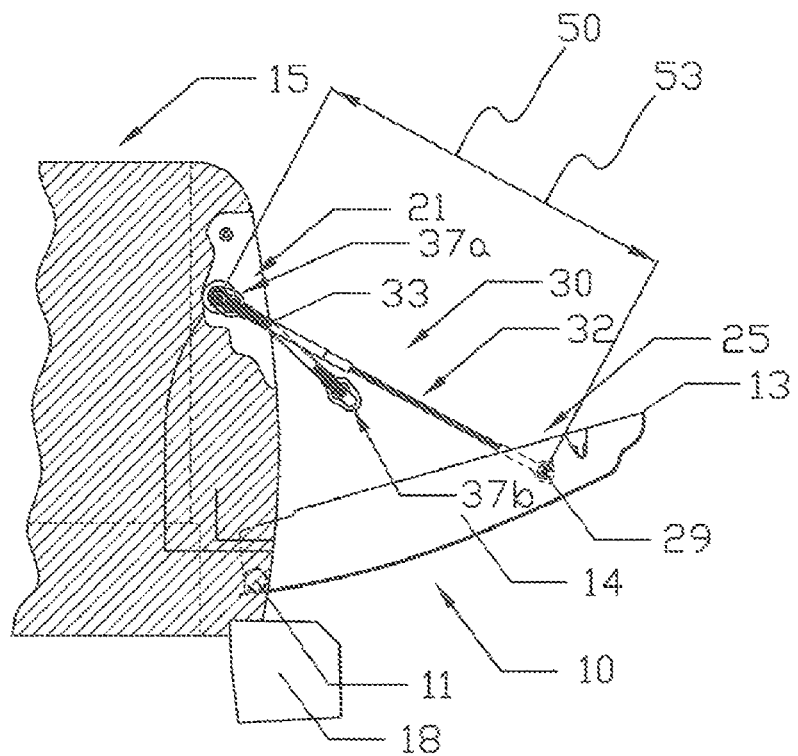

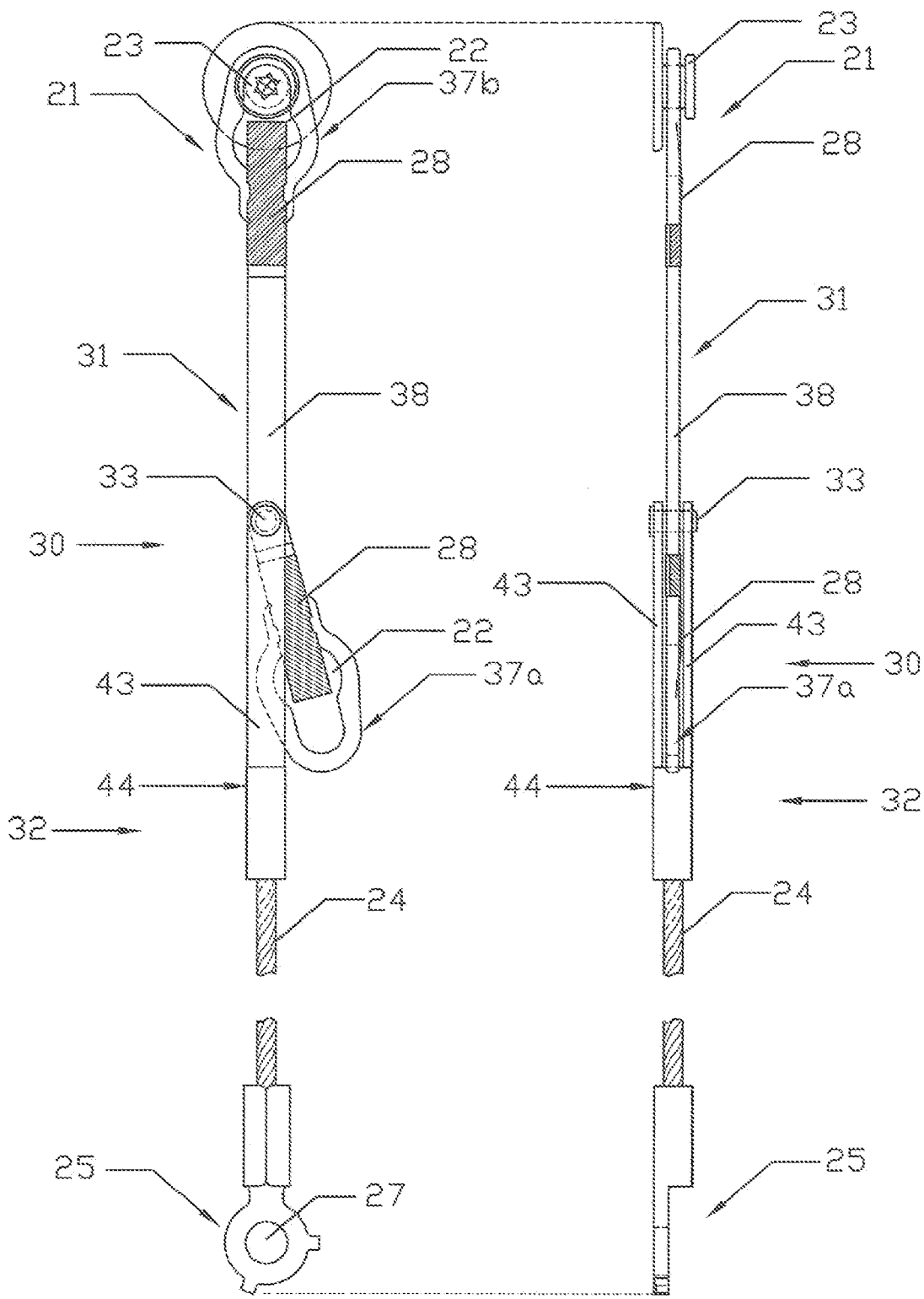

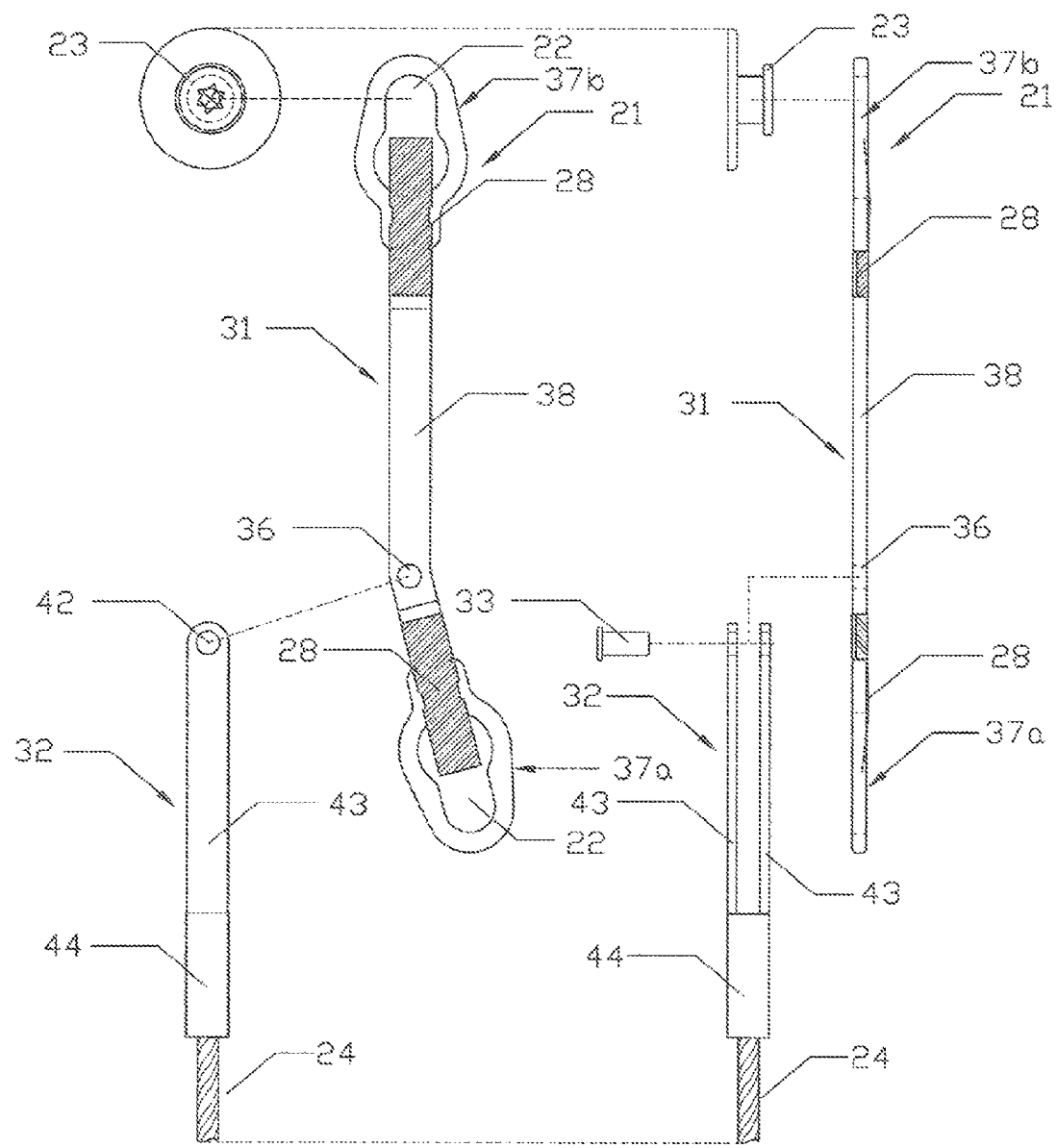

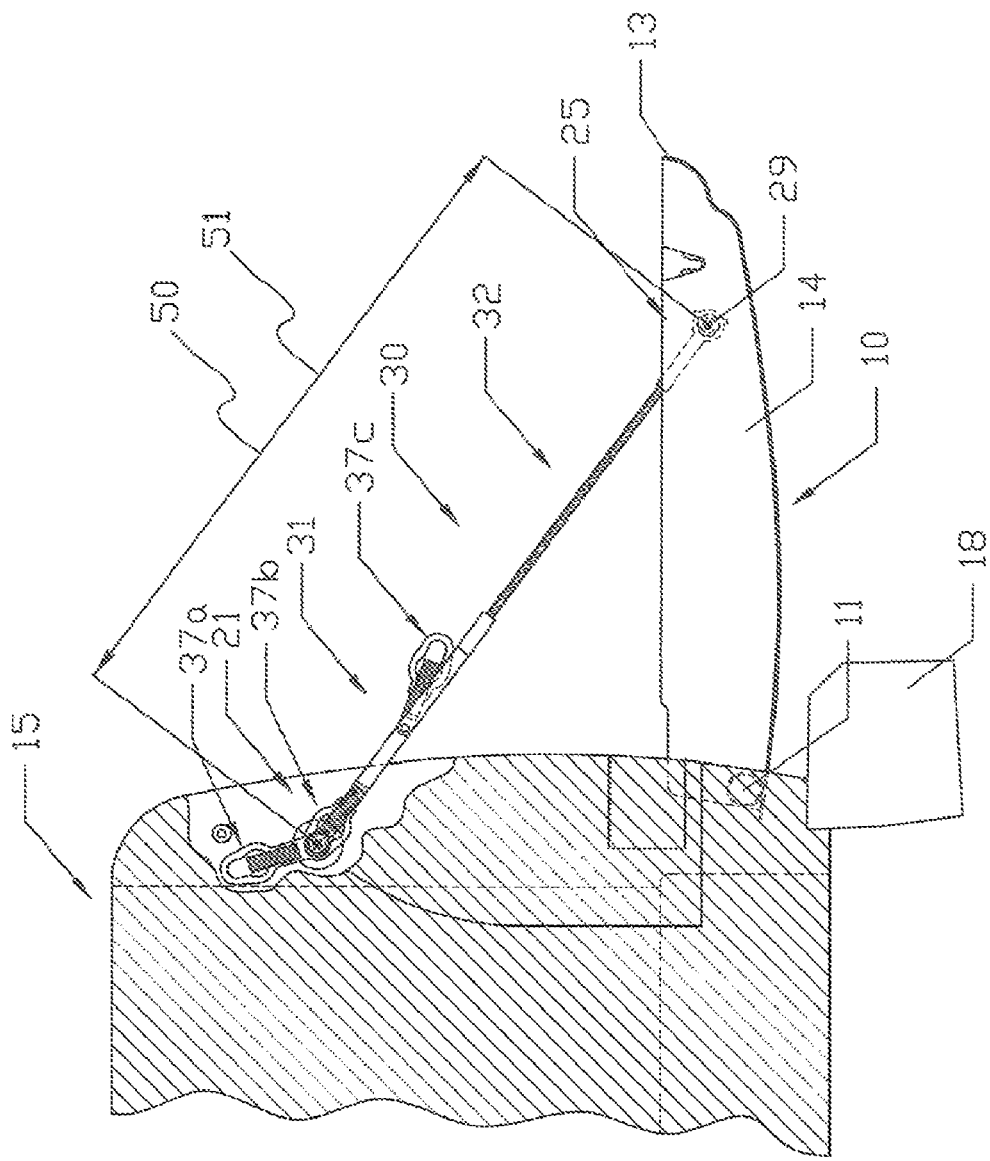

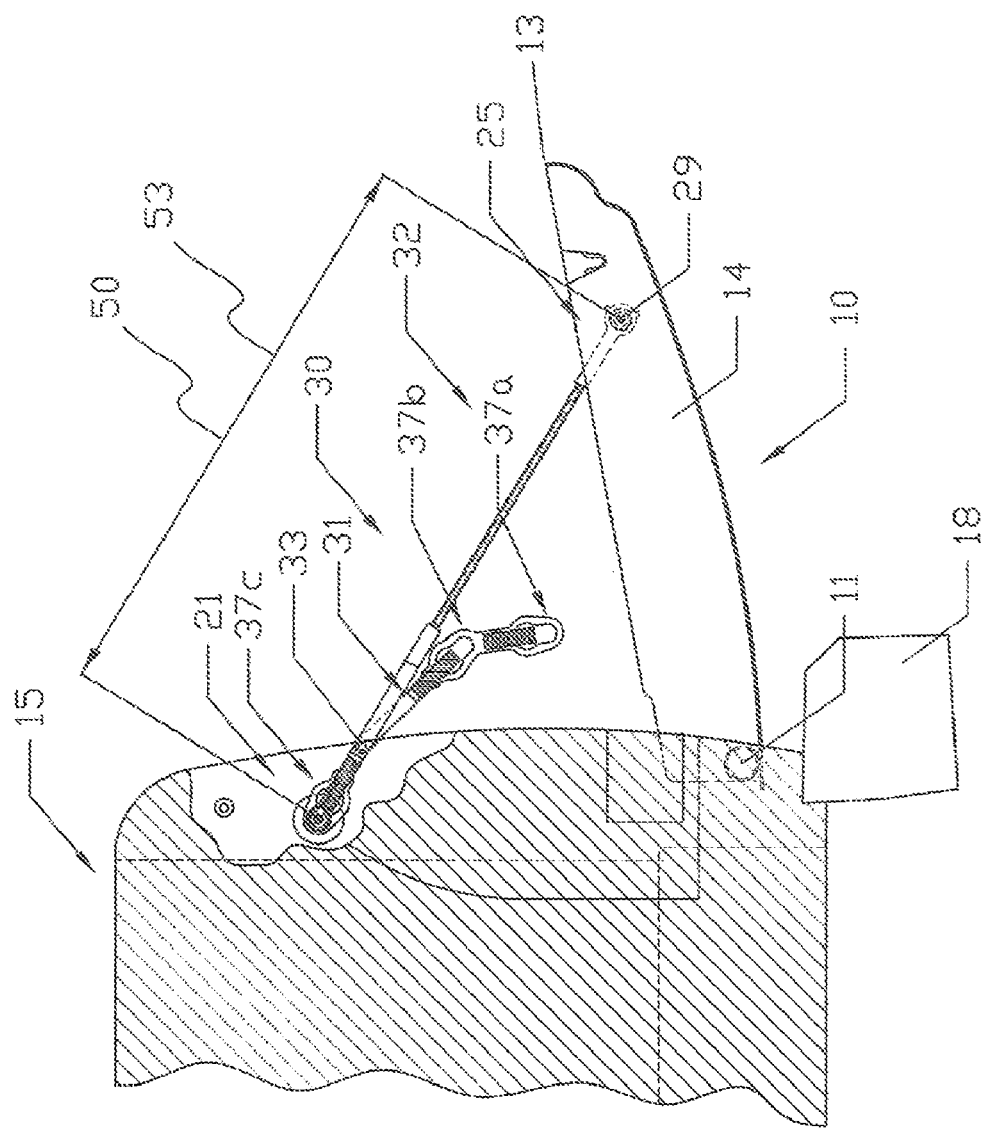

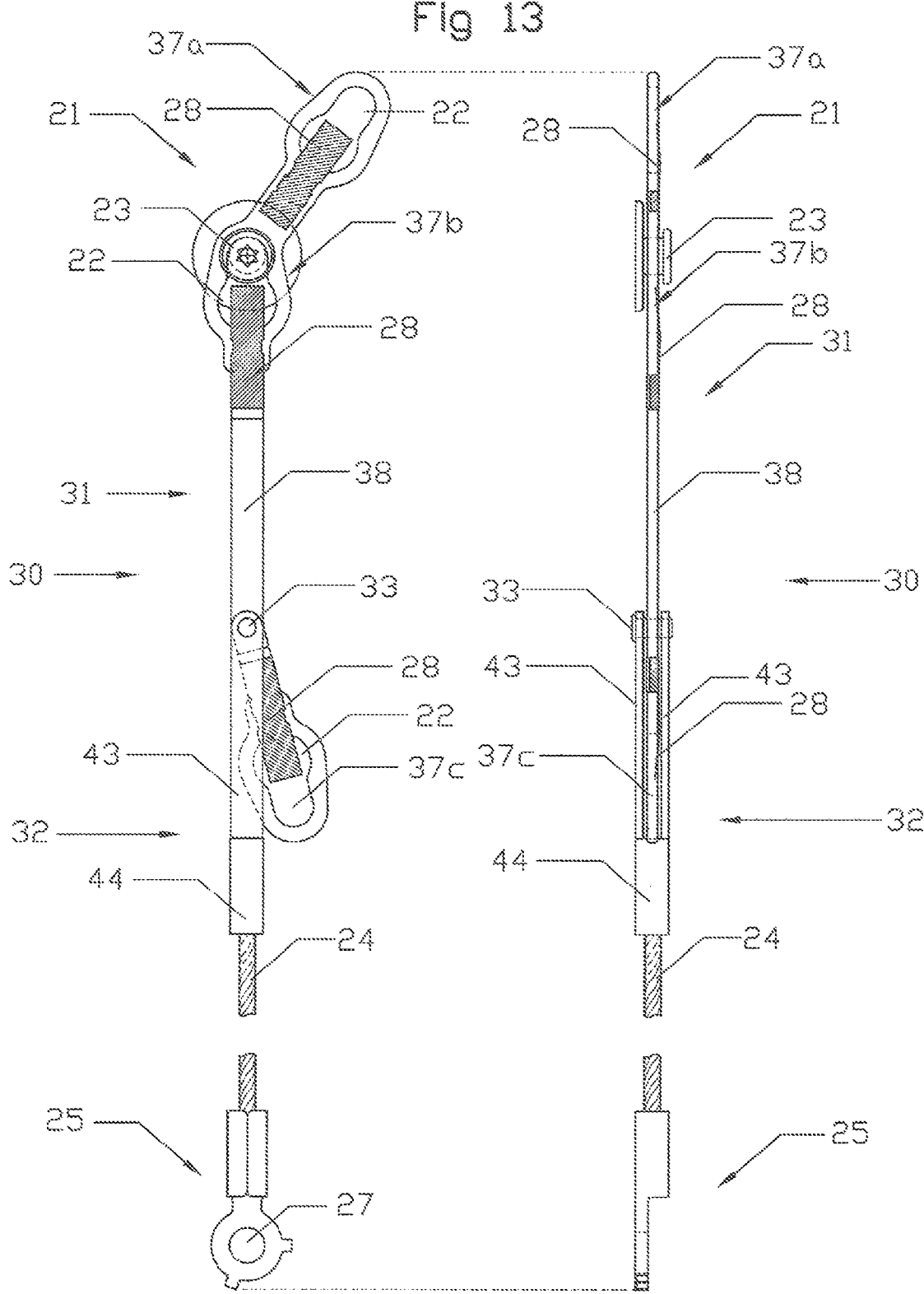

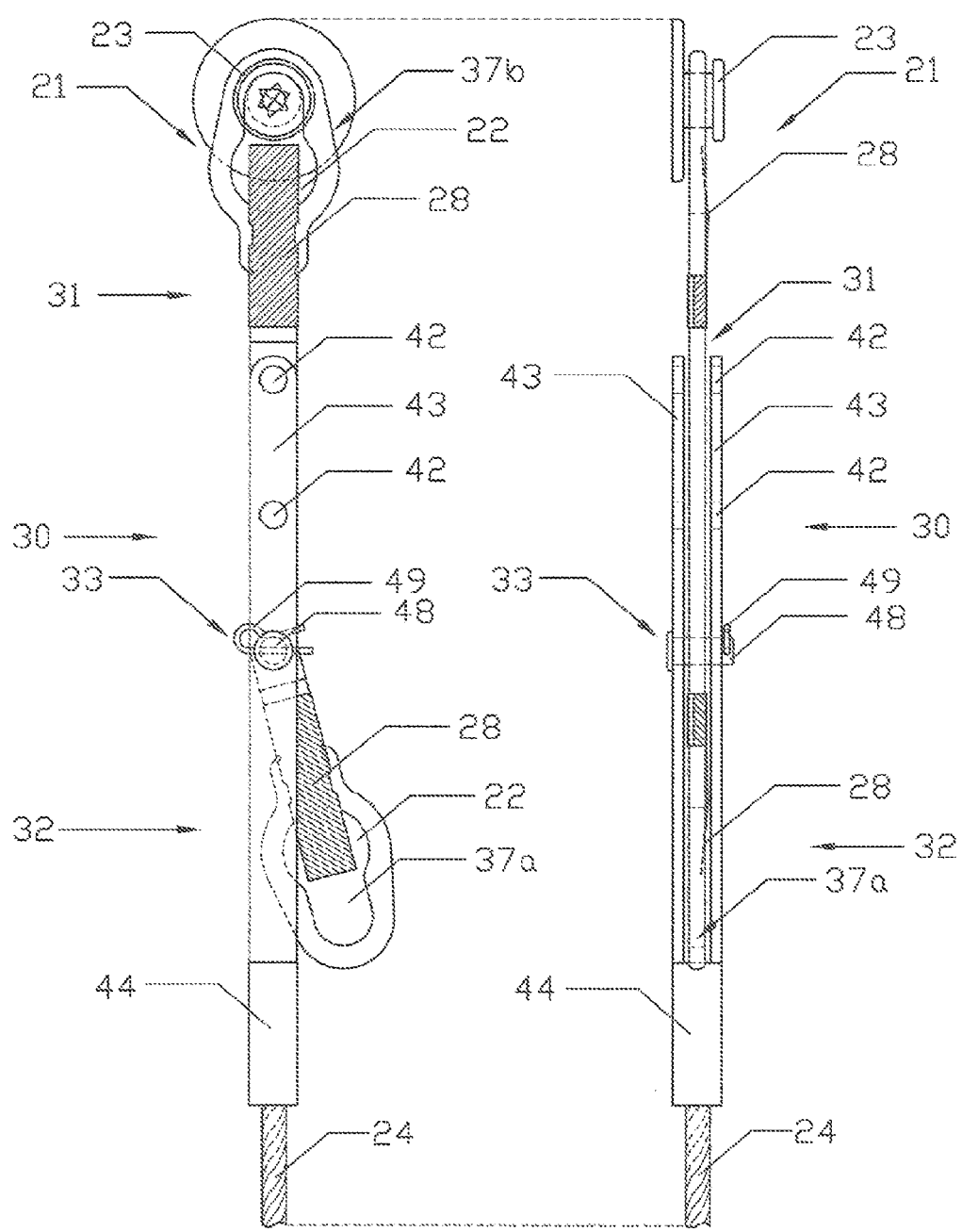

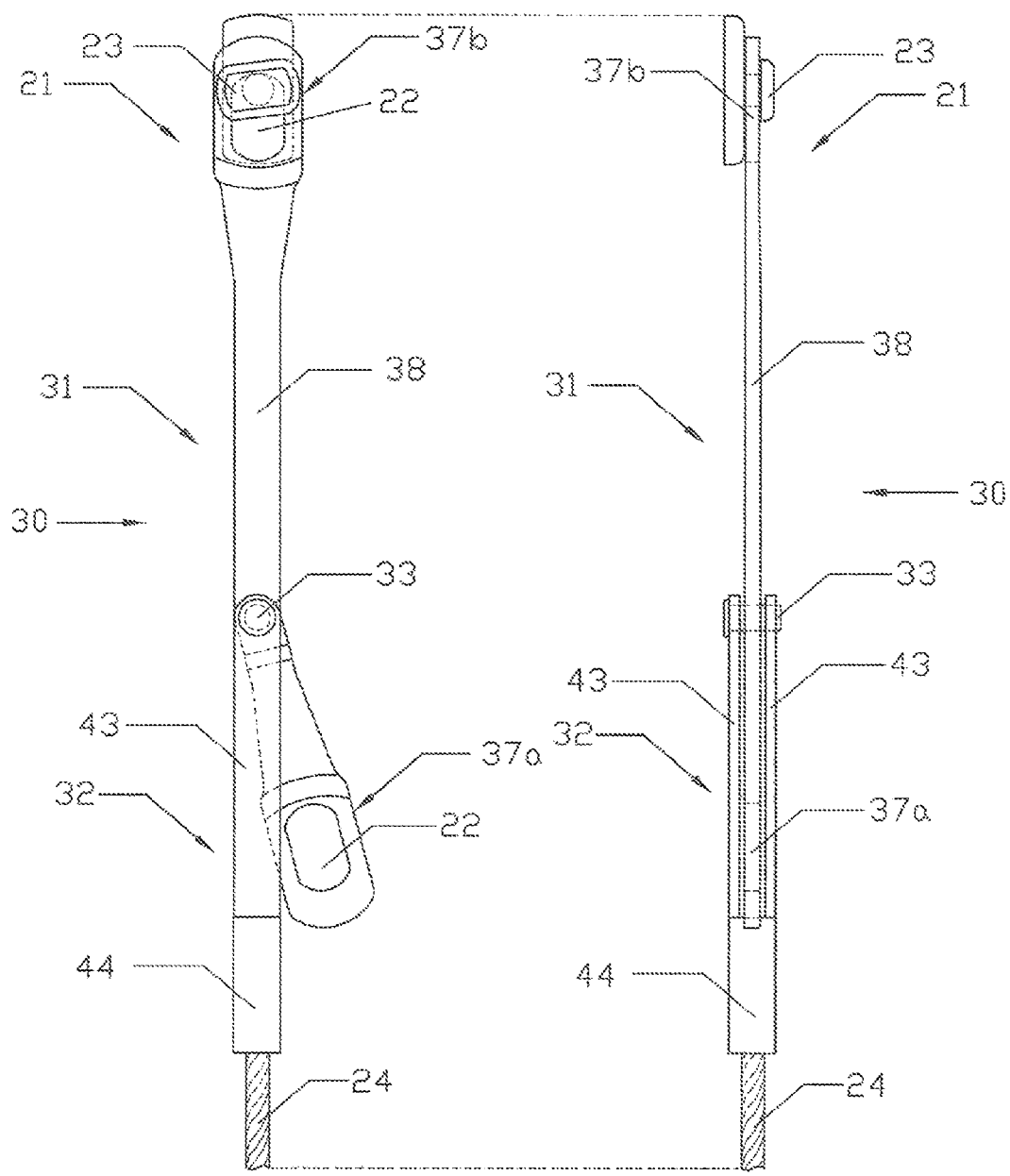

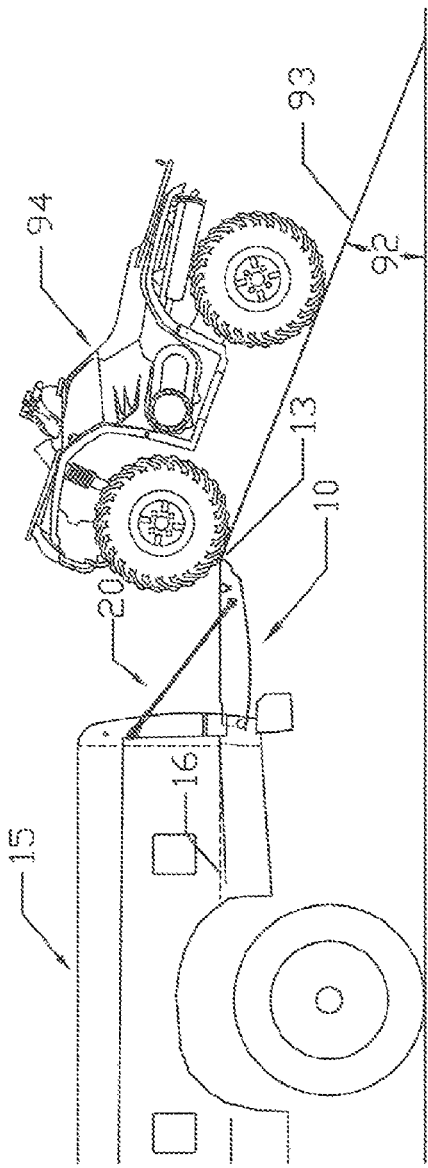

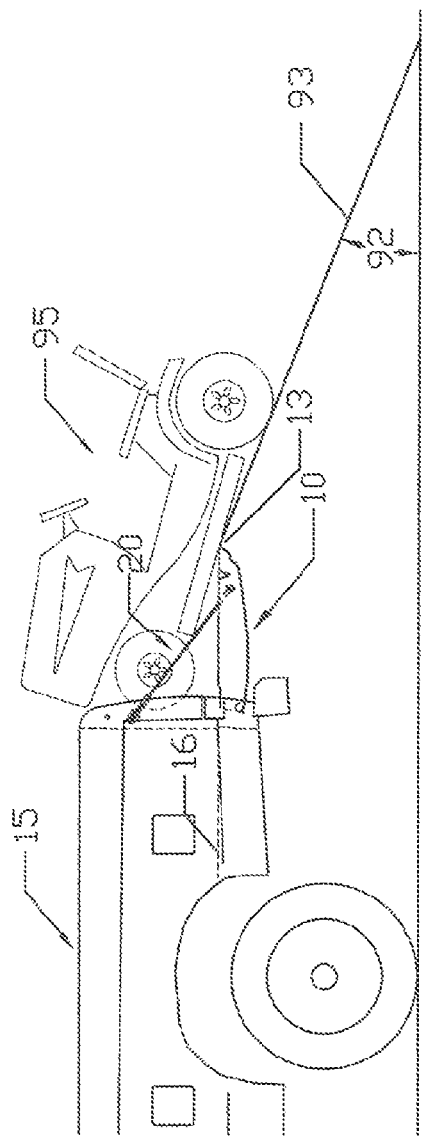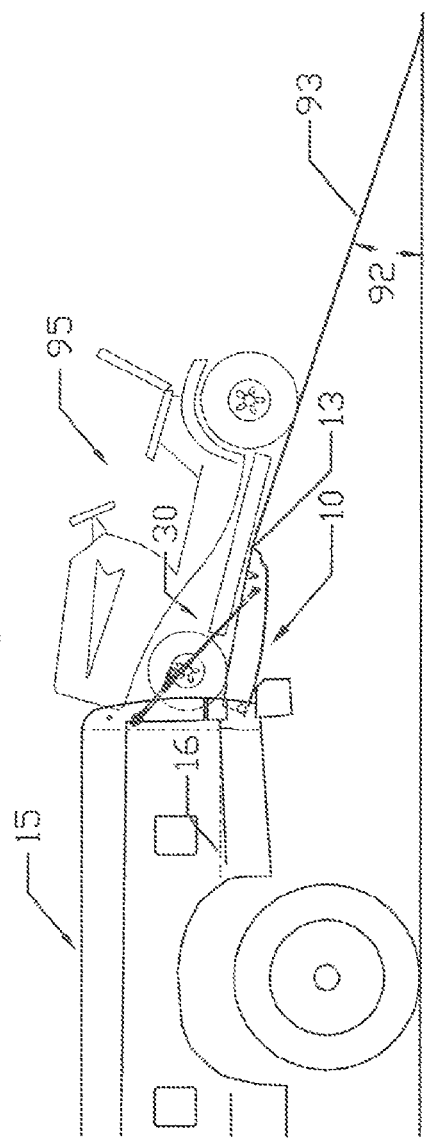

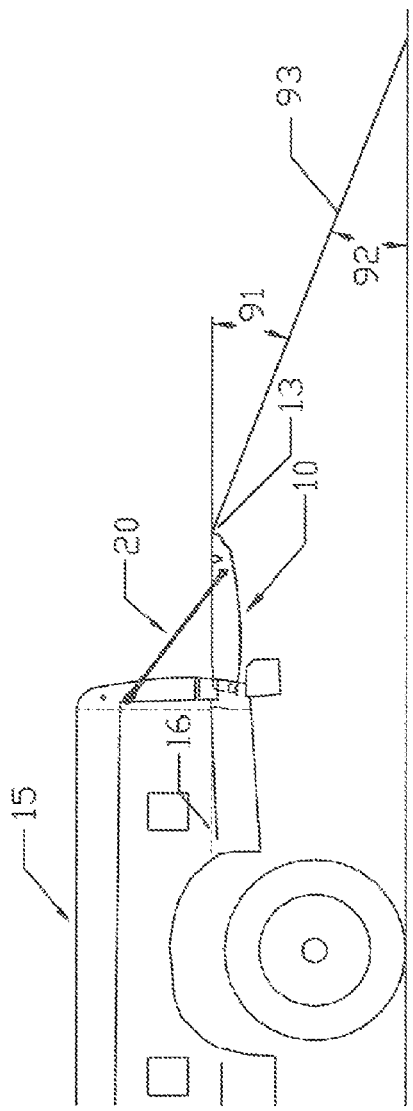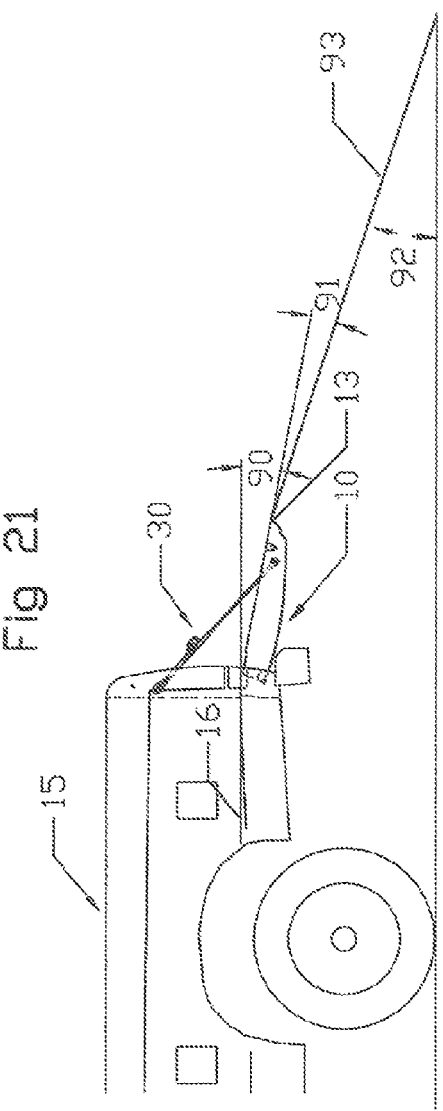

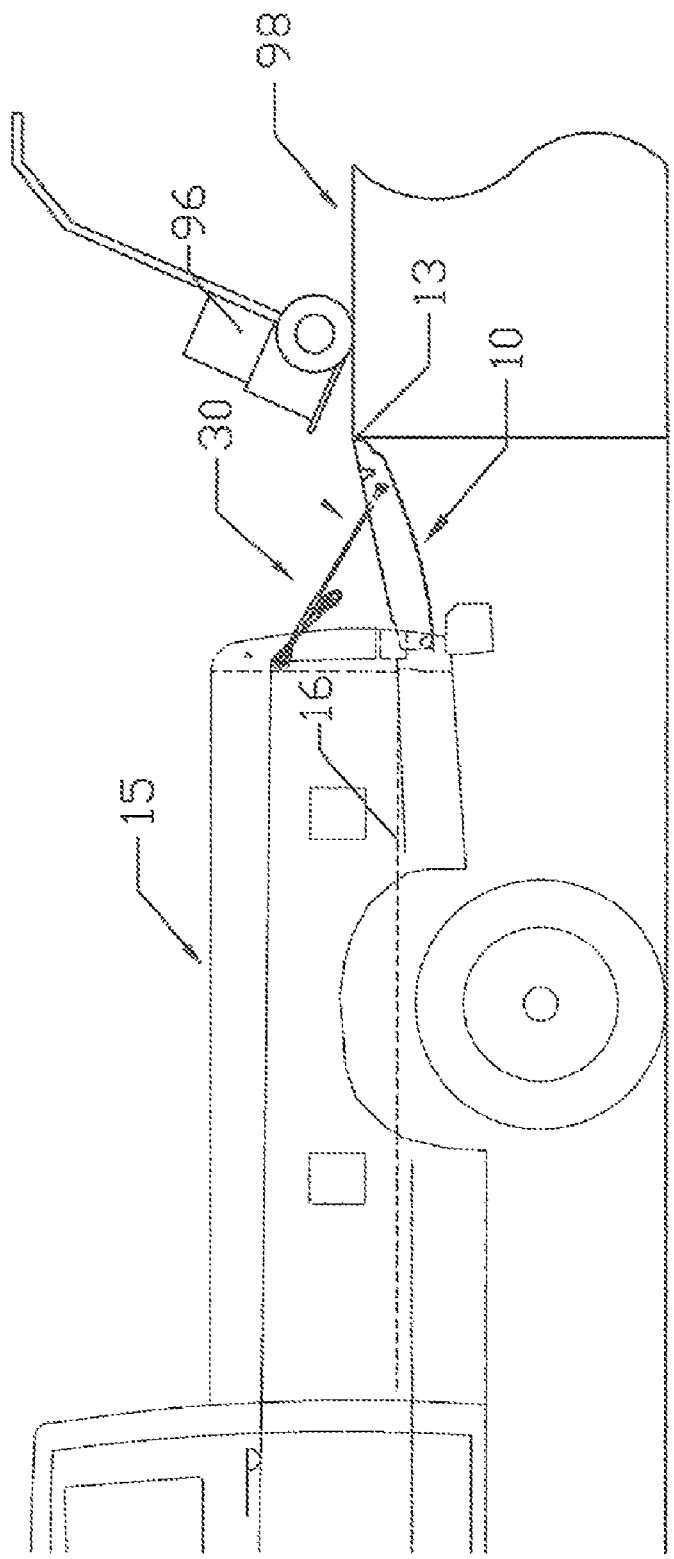

MULTI-POSITION TAILGATE SUPPORT APPARATUS AND METHOD

BACKGROUND

1. Field of Invention

This invention relates to motor vehicles and utility trailers and, more particularly, to apparatus and methods for a multi-position tailgate support facilitating suspension of a tailgate in multiple positions that each retain the tailgate's external appearance and full load-carrying capacity.

2. Prior Art

In certain situations, it may be desirable to have a low loading height on a vehicle. In the past, attempts to lower vehicle loading height have focused in two primary areas. First, attempts have been made to lower the bed height of certain vehicles. While this may work well for trailers and special purpose vehicles, it is problematic for multi-use vehicles like pickup trucks, which have certain structural limitations and clearance requirements. Second, attempts have been made to add hoists to vehicles. While hoists neutralize the need for a lower loading height by simply lifting the load for the user, they are typically large, heavy, and expensive. Thus, neither of these two areas of improvement is particularly helpful for the average pickup truck user.

Currently, many vehicles, including pickup trucks, have tailgates. However, a typical tailgate is of no assistance in raising or lowering vehicle loading height. Conventional tailgates pivot between a closed position and an open position. The open position is typically ninety degrees of rotation from the closed position. Accordingly, a typical tailgate in the open position forms an extension to the bed of the vehicle. Thus, the loading height of a vehicle with a tailgate is typically the height of the bed.

In view of the foregoing, what is needed is an inexpensive and unobtrusive apparatus and method for either raising or lowering the loading height of a vehicle like a common, everyday, pickup truck. Additionally, what is needed is a tailgate that retains its full load-bearing capacity in a partially open position, which position may provide increased retention of loads extending longer than the cargo area of the pickup truck.

SUMMARY

The present invention relates in selected embodiments to vehicles with tailgates such as, without limitation, pick-up trucks having tailgates that rotate about a horizontal pivot axis positioned proximate a lower edge of the tailgate. Certain devices in accordance with the present invention may provide an easy to install and use quick change, multi-position tailgate support. When installed, a tailgate support in accordance with the present invention may allow the tailgate to be used (e.g., loaded with weight) in multiple positions. For example, in one embodiment, the tailgate may be used in a conventional open position, one or more open positions above the conventional open position, and one or more positions below the conventional open position.

In selected embodiments, a tailgate support may include an array, a base, and a pivot. A pivot may pivotably connect an array to a base. An array may be connected to one of the tailgate and the side wall of the vehicle. A base may be connected to other of the tailgate and the side wall of the vehicle. For example, an array may engage the side wall, while the base connects to the tailgate. Accordingly, a tailgate support may extend between a side wall and tailgate and support or suspend the tailgate in an open position.

In certain embodiments, an array may include multiple engagement mechanisms. Each engagement mechanism may be configured to engage the side wall (or alternatively, the tailgate) of the vehicle. Accordingly, in certain applications, a first engagement mechanism may engage the side wall. In other applications, a second engagement mechanism may engage the side wall.

A pivot may be spaced a first distance from a first engagement mechanism and a second distance from a second engagement mechanism. The first distance may be different (e.g., longer or shorter) than the second distance. Accordingly, when the first engagement mechanism is in use (e.g., engages the side wall), the tailgate support may have a tensioned length from end to end of a first value. Alternatively, when the second engagement mechanism is in use (e.g., engages the side wall), the tailgate support may have a tensioned length from end to end of a second value, distinct from the first value. Thus, by manipulating (e.g., pivoting) an array from one engagement mechanism to another engagement mechanism, a user may change the tensioned length of a tailgate support.

Changes in the value of the tensioned length of a tailgate support may produce changes in the position at which a corresponding tailgate is supported or suspended. For example, at one value (corresponding to use of one engagement mechanism), a tailgate may be supported or suspended in a conventional open position, which is about ninety degrees of rotation from the closed position. At another value (corresponding to use of a different engagement mechanism), a tailgate may be supported or suspended with its leading or top edge lower than it is in the convention open position. At yet another value (corresponding to use of yet another engagement mechanism), a tailgate may be supported or suspended with its leading or top edge higher than it is in the convention open position.

Tailgate supports may provide the variability described hereinabove, while retaining the appearance and other functionality (e.g., opening, closing, locking, etc.) of the tailgate. In selected embodiments, installation of a tailgate support may not require permanent modification of the vehicle. The changes made when installing a tailgate support may be completely and easily reversible. Accordingly, a tailgate support in accordance with the present invention may be well suited as either an O.E.M option or an aftermarket accessory.

By supporting or suspending a tailgate in an open position that is more than ninety degrees from the closed position, a tailgate support may lower the loading height of the corresponding vehicle. A lower loading height may reduce the incline angle of loading ramps commonly used to load items such as motorcycles, ATVs, small tractors, and the like. Reducing the incline of such ramps may make it easier and safer to load and unload such items. Additionally, a tailgate with a lower leading edge may support loading of items with low ground clearance (e.g., riding lawn mowers), which would normally hang on the leading edge of a conventional tailgate at the location where the ramps rest.

By supporting or suspending a tailgate in an open position that is less than ninety degrees from the closed position, a tailgate support may resist rearward movement of cargo that is longer than the cargo area of the corresponding vehicle. Additionally, a tailgate with a higher leading edge may facilitate transfer of items between a cargo area and surfaces higher than the cargo area (e.g., loading docks).

Selected embodiments in accordance with the present invention may comprise systems or packages including a new bumper or bumper relocation kit. These new bumpers or bumper relocation kits may accommodate a lower tailgate position than conventional bumpers. Such bumpers and bumper relocation kits may support greater lowering by a tailgate support in accordance with the present invention.

Additionally, tailgate supports in accordance with the present invention may be packaged or combined with paint protection padding or barrier material. This padding or barrier material may be applied to the tailgate, bed side surfaces of a vehicle, or combinations thereof that are adjacent a tailgate support when the tailgate is in the closed position. This padding or barrier material may reduce or eliminate any adverse effects or wear caused by tailgate supports in accordance with the present invention.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 1 is a perspective view of one embodiment of a truck bed with a tailgate in a conventional open position;

FIG. 2 is a partial rear elevation view of a pickup truck having a tailgate in the closed position illustrating how a tailgate support in accordance with the present invention fits within the void between the side edge of the tailgate and the side wall of the truck bed;

FIG. 3 is a partial side elevation view of a pickup truck having a tailgate in the closed position illustrating how a tailgate support in accordance with the present invention fits within the void between the side edge of the tailgate and the side wall of the truck bed;

FIG. 5 is a side elevation view of the tailgate support of FIG. 4 suspending a tailgate below the conventional open position;

FIG. 6 is a side elevation view of an alternative embodiment of a two-position tailgate support in accordance with the present invention suspending a tailgate in the conventional open position;

FIG. 7 is a side elevation view of the tailgate support of FIG. 7 suspending a tailgate above the conventional open position;

FIG. 8 provides partial side and front elevation views of the tailgate support of FIG. 4;

FIG. 9 provides partial, exploded, side and front elevation views of the tailgate support of FIG. 4;

FIG. 10 is a side elevation view of one embodiment of a three-position tailgate support in accordance with the present invention suspending a tailgate in the conventional open position;

FIG. 12 is a side elevation view of the tailgate support of FIG. 10 suspending a tailgate above the conventional open position;

FIG. 13 provides partial front and side elevation views of the tailgate support of FIG. 10;

FIG. 14 provides partial front and side elevation views of another alternative embodiment of a two-position tailgate support having multiple pivot pin apertures in a base in accordance with the present invention;

FIG. 15 provides partial side and front elevation views of another alternative embodiment of a two-position tailgate support;

FIG. 16 is a schematic diagram illustrating the loading of an ATV onto a tailgate suspended in a conventional open position;

FIG. 17 is a schematic diagram illustrating the loading of an ATV onto a tailgate suspended, by a tailgate support in accordance with the present invention, below a conventional open position;

FIG. 18 is a schematic diagram illustrating the loading of a riding lawn mower onto a tailgate suspended in a conventional open position;

FIG. 19 is a schematic diagram illustrating the loading of a riding lawn mower onto a tailgate suspended, by a tailgate support in accordance with the present invention, below a conventional open position;

FIG. 20 is a schematic diagram illustrating the break-over angle of a tailgate suspended in a conventional open position;

FIG. 21 is a schematic diagram illustrating the break-over angle of a tailgate suspended, by a tailgate support in accordance with the present invention, below a conventional open position;

FIG. 24 is a schematic diagram illustrating a tailgate suspended, by a tailgate support in accordance with the present invention, above a conventional open position to facilitate loading the bed of a pickup truck from surfaces higher than the bed.

KEY FOR REFERENCE NUMERALS CONTAINED IN DRAWINGS

Figure 4:
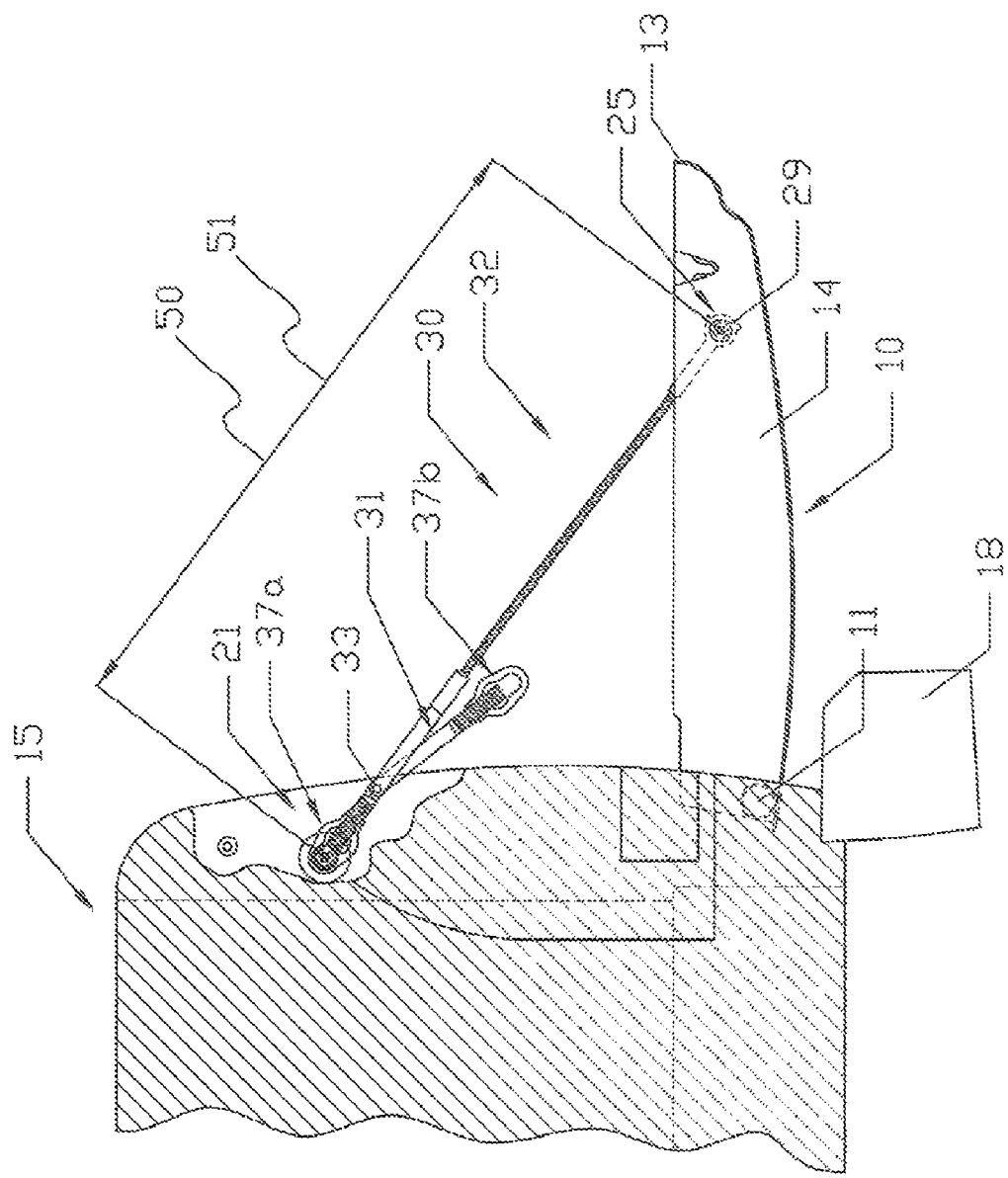
FIG. 4 is a side elevation view of one embodiment of a two-position tailgate support in accordance with the present invention suspending a tailgate in the conventional open position.
Figure 11:
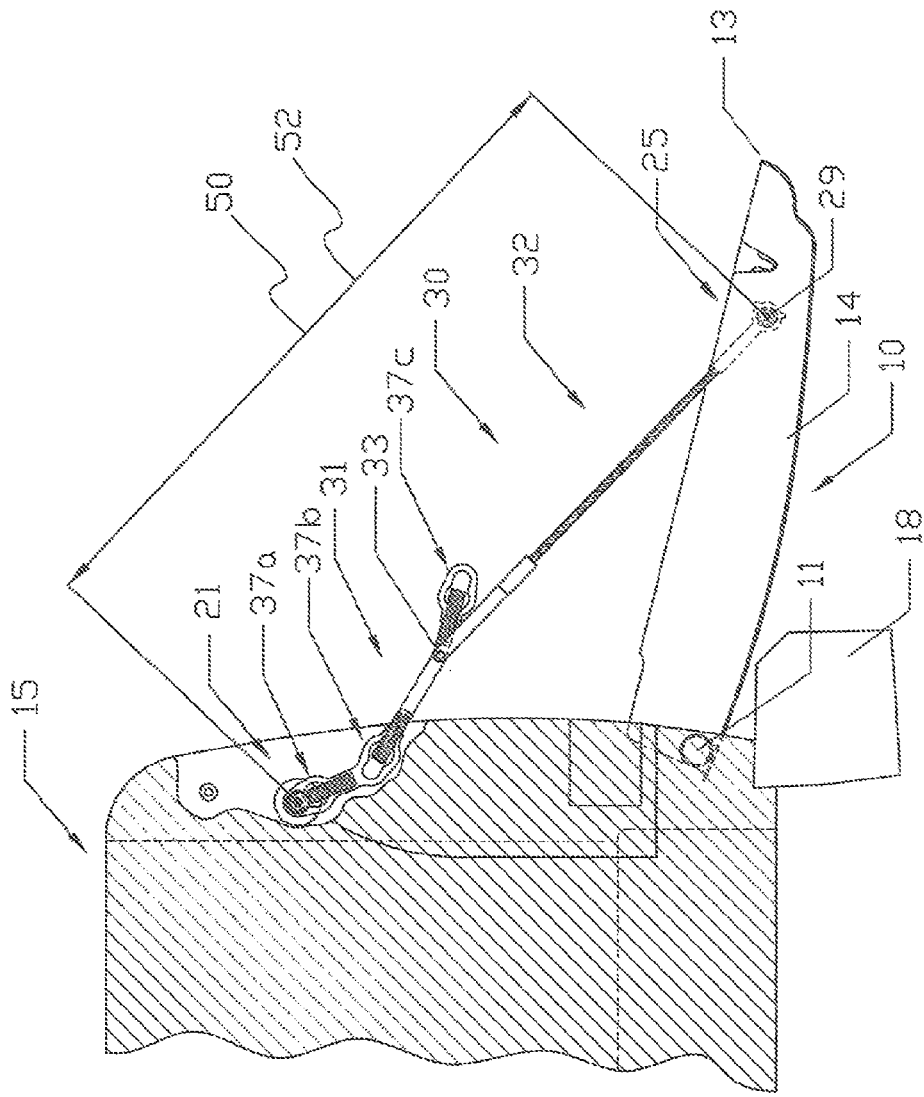
FIG. 11 is a side elevation view of the tailgate support of FIG. 10 suspending a tailgate below the conventional open position.

10—tailgate
11—tailgate hinge pivot
12—pivot edge
13—leading edge or top edge
14—tailgate side
15—cargo area or truck bed
16—bed floor
17—bed side or side wall
18—bumper
19—void between bed side and tailgate edge when tailgate is closed
20—tailgate cable or linkage
21—first or detachable end
22—receiving aperture
23—stud
24—cable
25—second or fixed end
27—aperture
28—retainer
29—bolt
30—tailgate support
31—array
32—base
33—pivot
36—pivot aperture 37—engagement mechanism
38—interior portion of array
42—pivot aperture
43—extensions or legs of mount portion of base
44—mount portion of base
48—pin
49—keeper or retainer
50—tensioned length
51—first value of tensioned length
52—second value of tensioned length
53—third value of tensioned length
90—tailgate decline angle
91—break over angle
92—loading ramp angle
93—loading ramp
94—All Terrain Vehicle (ATV)
95—riding lawn mower
96—cargo
97—motorcycle
98—loading dock

DETAILED DESCRIPTION OF SELECTED EMBODIMENTS

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIG. 1, in selected embodiments, a cargo area 15 or bed 15 of a vehicle such as a pickup truck may include a tailgate 10, two bed sides 17 or side walls 17, two tailgate cables 20 or linkages 20, and a bed floor 16. A tailgate 10 may be pivotable about a tailgate pivot 11 and have a pivot edge 12 and a leading or top edge 13. The tailgate 10 may be supported or suspended in the open position by the tailgate cables 20 or linkages 20. One end of each tailgate cable 20 or linkage 20 may be attached to a stud 23 located on the side walls 17 or bed sides 17 of the cargo area 15. The other end of each tailgate cable 20 or linkage 20 may attach to a tailgate side 14. The tailgate 10 may be pivotable about a tailgate pivot 11 between a generally vertical closed position and an open position.

Referring to FIGS. 2 through 5, a tailgate support 30 in accordance with the present invention may be installed in the place of a tailgate cable 20 or tailgate linkage 20. This may be done as an "aftermarket" modification. For example, after purchasing a pickup truck, an owner may purchase two tailgate supports 30. The owner may then remove the two tailgate cables 20 or linkages 20 from the pickup truck and install in the place thereof the two tailgate supports 30. Alternatively, one or more tailgate supports 30 may be installed on a vehicle in an initial manufacturing process.

A tailgate support 30 in accordance with the present invention may be configured to minimize any undesirable wear on the vehicle of a user. For example, in certain embodiments, one or more surfaces of the tailgate support 30 may be coated with a rubber like material to protect the paint on a corresponding vehicle. Alternatively, tailgate supports 30 in accordance with the present invention may be packaged or combined with paint protection padding or barrier material. This padding or barrier material may be applied to the tailgate 10, bed side 17 surfaces of a vehicle, or combinations thereof that are adjacent a tailgate support 30 when the tailgate 10 is in the closed position. This padding or barrier material may reduce or eliminate any adverse effects or wear caused by tailgate supports 30.

In selected embodiments, a tailgate support 30 may include an array 31, a base 32, and a pivot 33. A pivot 33 may pivotably connect an array 31 to a base 32. An array 31 may be connected to one of the tailgate 10 and the side wall 17 of the vehicle. A base 32 may be connected to other of the tailgate 10 and the side wall 17 of the vehicle. For example, in the illustrated embodiment, the array 31 engages the side wall 17, while the base connects to the tailgate 10. Accordingly, a tailgate support 30 may extend between a side wall 17 and tailgate 10 and support or suspend the tailgate 10 in an open position.

In certain embodiments, an array 31 may include multiple engagement mechanisms 37. For example, in the illustrated embodiment, the array 31 includes a first engagement mechanism 37a and a second engagement mechanism 37b. Each engagement mechanism 37 may be configured to engage the side wall 17 (or alternatively, the tailgate 10) of the vehicle. Accordingly, in certain applications, the first engagement mechanism 37a may engage the side wall 17. In other applications, the second engagement mechanism 37b may engage the side wall 17.

A pivot 33 may be spaced a first distance from the first engagement mechanism 37a. The pivot 33 may be spaced a second distance from the second engagement mechanism 37b. Moreover, the first distance may be different (e.g., longer or shorter) than the second distance. Accordingly, when the first engagement mechanism 37a is in use (e.g., engages the side wall 17), the tailgate support 30 may have a tensioned length 50 from end to end of a first value 51. Alternatively, when the second engagement mechanism 37b is in use (e.g., engages the side wall 17), the tailgate support 30 may have a tensioned length 50 from end to end of a second value 52. Thus, by manipulating (e.g., pivoting) an array 31 from one engagement mechanism 37 to another engagement mechanism 37, a user may change the tensioned length 50 (i.e., length when tensioned from one extreme to the other) of a tailgate support 30.

Changes in the value of the tensioned length 50 of a tailgate support 30 may produce changes in the position at which a corresponding tailgate 10 is supported or suspended. In the illustrated embodiment, with one value 51 corresponding to use of a first engagement mechanism 37a, a tailgate 10 may be supported or suspended in a conventional open position, which is about ninety degrees of rotation from the closed position. With another value 52 corresponding to use of a second engagement mechanism 37b, a tailgate 10 may be supported or suspended with its leading or top edge 13 lower than it is in the convention open position.

Referring to FIGS. 6 and 7, in certain embodiments, the base 32 of a tailgate support 30 may include a length of cable 24. The length of this cable 24 may differ between different embodiments of the present invention. For example, in selected embodiments, the length of the cable 24 may be selected such that use of the second engagement mechanism 37b provides a tensioned length 50 of a value 51 corresponding to the tailgate 10 supported or suspended in a conventional open position (i.e., about ninety degrees of rotation from the closed position). In such embodiments, use of the first engagement mechanism 37a may provide a tensioned length 50 of a value 53 corresponding to the tailgate 10 supported or suspended with its leading or top edge 13 higher than it is in the convention open position.

Referring to FIGS. 8 and 9, in selected embodiments, a tailgate support 30 may include hardware facilitating installation thereof on existing, common, or conventional tailgate systems. For example, the receiving apertures 22 and corresponding retainers 28 of the various engagement mechanisms 37 of an array 31 may each be sized and shaped to engage and retain a stud 23 extending from the side wall 17 of a vehicle. In such embodiments, a second end 25 of the tailgate support 30 may be attached to the tailgate side 14 by a fastener (e.g., a bolt 29). In selected embodiments, the second end 25 may include an aperture 27 for receiving the fastener 29 therethrough.

In certain embodiments, one end of a base 32 may form the second end 25 of a tailgate support 30. The other end of the base 32 may include or be configured as a mount 44. A mount 44 may facilitate engagement between a base 32 and an array 31. A length of cable 24 may extend to connect the aperture 27 to the mount 44.

A mount 44 may include two extensions 43 or legs 43 with a pivot aperture 42 extending therethrough. A corresponding pivot aperture 36 may be formed in an array 31. Accordingly, an array 31 may be positioned between the two extensions 43 such that the pivot aperture 36 of the array 31 aligns with the pivot apertures 42 of the mount 44 to form a composite aperture. In such embodiments, a pivot 33 configured as a pin may be inserted within the composite aperture to pivotably connect the array 31 to the base 32. The pivot 33 may be held in place within the composite aperture in any suitable manner. For example, in one embodiment, the pivot 33 may be held in place via an interference fit between the pivot 33 and at least one extension 43 of the mount 44.

An array 31 in accordance with the present invention may have any suitable shape or configuration. Proper clearance of a tailgate support 30 throughout its range of motion may be a primary consideration in selecting the shape of an array 31 (and in positioning the various engagement mechanisms 37 forming part of the array 31). In certain embodiments, it may be desirable to maintain a relatively slender profile for a tailgate support 30, regardless of which engagement mechanism 37 is being used. This may ensure that the tailgate support 30 folds or bends into a compact shape that fits within the available void 19 when the tailgate 10 is in the closed position.

In selected embodiments, an array 31 may have a somewhat linear interior portion 38. One engagement mechanism 37a may connect to one end of the interior portion 38, while another engagement mechanism 37b may connect to the other end of the interior portion 38. In certain embodiments, the interior portion 38 may include a slight bend proximate the pivot 33. This slight bend may ensure that the array 31 has sufficient clearance with respect to the base 31 (e.g., mount 44) without regard to which engagement mechanism 37 is in use.

In such embodiments, to adjust the tensioned length 50 of a tailgate support 30, a user may disengage a retainer 28 and then remove an aperture 22 of one engagement mechanism 37 from a corresponding stud 23 extending as part of or from the side wall 17 of the vehicle. The user may next pivot the array 31 and align the aperture 22 of another engagement mechanism 37 with the stud 23. Finally, the user may effect an engagement between this other engagement mechanism 37 and the stud 23. This process may be repeated for each tailgate support 30 connected to the tailgate 10. Thus, the user may adjust the location of suspension for the tailgate 10.

The components of a tailgate support 30 in accordance with the present invention may be formed of any suitable material or combination of materials. Suitable materials may be selected based on cost, formability, strength, durability, corrosion resistance, and the like. In selected embodiments, the components of a tailgate support 30 may be formed of metal, metal alloys, or combinations thereof.

Referring to FIGS. 10 through 13, in certain embodiments, an array 31 may include more than two engagement mechanisms 37. For example, as in the illustrated embodiment, an array 31 may include a first engagement mechanism 37a, second engagement mechanism 37b, and a third engagement mechanism 37c. In such embodiments, a pivot 33 may be spaced a first distance from the first engagement mechanism 37a, a second distance from the second engagement mechanism 37b, and a third distance from the third engagement mechanism 37c. Each such distance may be different (e.g., longer or shorter) than the others.

Accordingly, when the first engagement mechanism 37a is in use (e.g., engages the side wall 17), the tailgate support 30 may have an end to end tensioned length 50 of a first value 52. When the second engagement mechanism 37b is in use (e.g., engages the side wall 17), the tailgate support 30 may have an end to end tensioned length 50 of a second value 51. Finally, when the third engagement mechanism 37c is in use (e.g., engages the side wall 17), the tailgate support 30 may have an end to end tensioned length 50 of a third value 53. Thus, by manipulating (e.g., pivoting) an array 31 from one engagement mechanism 37 to another engagement mechanism 37, a user may change the tensioned length 50.

As in selected other embodiments in accordance with the present invention, changes in the value of the tensioned length 50 of a tailgate support 30 may produce changes in the position at which a corresponding tailgate 10 is supported or suspended. In the illustrated embodiment, with one value 52 (corresponding to use of a first engagement mechanism 37a), a tailgate 10 may be supported or suspended with its leading or top edge 13 lower than it is in the conventional open position. With another value 51 (corresponding to use of a second engagement mechanism 37b), a tailgate 10 may be supported or suspended in the convention open position. Finally, with yet another value 53 (corresponding to use of a third engagement mechanism 37c), a tailgate 10 may be supported or suspended with its leading or top edge 13 higher than it is in the convention open position.

In certain embodiments, one particular engagement mechanism 37b may correspond to a tailgate 10 supported or suspended in the convention open position. The number of engagement mechanisms 37 on each side of this particular engagement mechanism 37b need not be balanced. Additionally, the number of engagement mechanisms 37 on each side of a pivot 33 need not be balanced. For example, in the illustrated embodiment, there are two engagement mechanisms 37a, 37b on one side of the pivot 33 and only one engagement mechanism 37c on the other side thereof.

Referring to FIG. 14, in selected embodiments, a mount 44 of a base 32 may include more than one pivot aperture 42. A pivot 33 may be selectively movable from one pivot aperture 42 to another pivot aperture 42. Multiple pivot apertures 42 may multiply the number of tensioned length 50 values provided by a tailgate support 30.

For example, a pivot 33 may comprise a pin 48 held in place by a retainer 49 (e.g., a cotter pin 49, R-clip 49, etc.). Removal of the retainer 49 may enable a user to remove the pin 48. With the pin 48 removed, a user may move an array 31 until the pivot aperture 36 thereof aligns with another pivot aperture 42 of the mount 44, thereby forming a new composite aperture.

The pin 48 may then be inserted into the new composite aperture and secured in place with the retainer 49. This process may be repeated for each tailgate support 30 connected to the tailgate 10.

With the relocated pivot 33, the array 31 may still be pivotably connected to the base 32. However, a particular distance may have been added or subtracted from the value of the tensioned length 50. This change may be reflected in the value of the tensioned length 50, regardless of which engagement mechanism 37 is being used. Accordingly, a mount 44 having more than one pivot aperture 42 may support fine tuning of the location in which a tailgate 10 is supported or suspended.

Referring to FIG. 15, while the embodiments described hereinabove include tailgate supports 30 comprising apertures 22 and keepers 28, other attachment mechanisms may be used or substituted in the embodiments described. Accordingly, the engagement mechanisms 37 of an array 31 may be configured to fit existing, common, or conventional tailgate systems. For example, in the illustrated embodiment, the engagement mechanisms 37 of an array 31 have been configured to fit an alternative embodiment of a stud 23 extending from the vehicle (e.g., from the side wall 17 of a truck bed). Due to the shape of this alternative stud 23, the illustrated engagement mechanisms 37a, 37b may include apertures 22, but need not include keepers 28.

Referring to FIGS. 16 and 17, by allowing a tailgate 10 to open more than ninety degrees, embodiments in accordance with the present invention lower the leading or top edge 13 of the tailgate 10. This may result in a reduction in the incline of loading ramps 93 used when loading items such as motorcycles, ATV's 94, small tractors, or the like into the bed of a vehicle. By reducing the loading ramp angle 92 of the loading ramps 93, it may be easier and safer to load and unload such items.

Referring to FIGS. 18 through 21, a tailgate 10 with a lower leading edge 13 may facilitate loading of items with low ground clearance (e.g., riding lawn mowers 95). Such items would normally hang on the leading edge 13 of a conventional tailgate 10 at the location where the loading ramps 93 rest. However, in embodiments in accordance with the present invention, when the leading edge 13 of the tailgate 10 is lowered below the plane of the bed floor 16, both the incline of the loading ramps 93 and the break-over angle 91 are reduced.

The break-over angle 91 may be defined as the angle between the plane of the tailgate 10 extended rearward and the angle of the loading ramp(s) 93. The angle that a tailgate 10 rotates down from the conventional open position to a fully open position in accordance with the present invention may be referred to as the tailgate decline angle 90. Accordingly, between the tailgate decline angle 90 and the reduced break-over angle 91, embodiments in accordance with the present invention may provide a more gradual transition from ground to bed floor 16.

Figure 22:
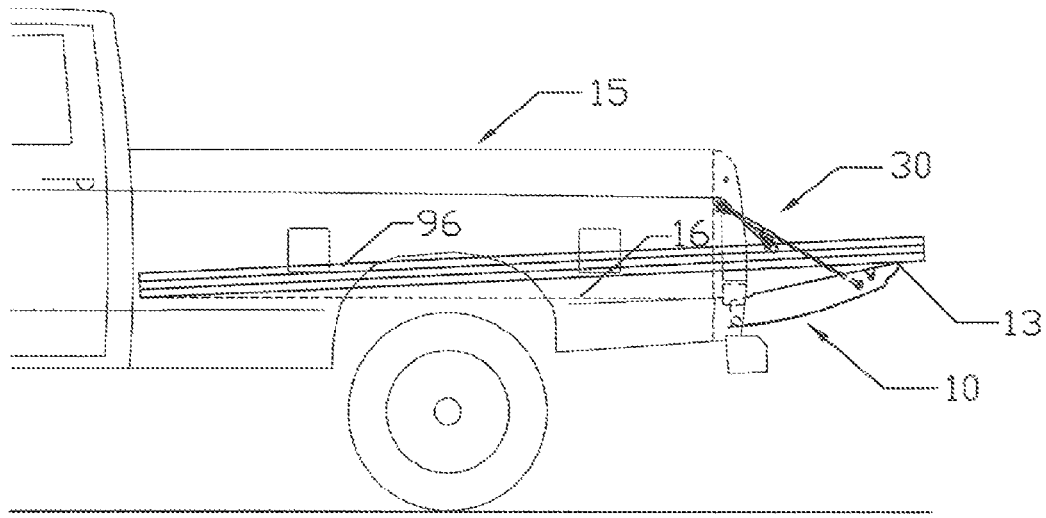
FIG. 22 is a schematic diagram illustrating a tailgate suspended, by a tailgate support in accordance with the present invention, above a conventional open position to better retain cargo extending longer than the bed of the pickup truck.
Figure 23:
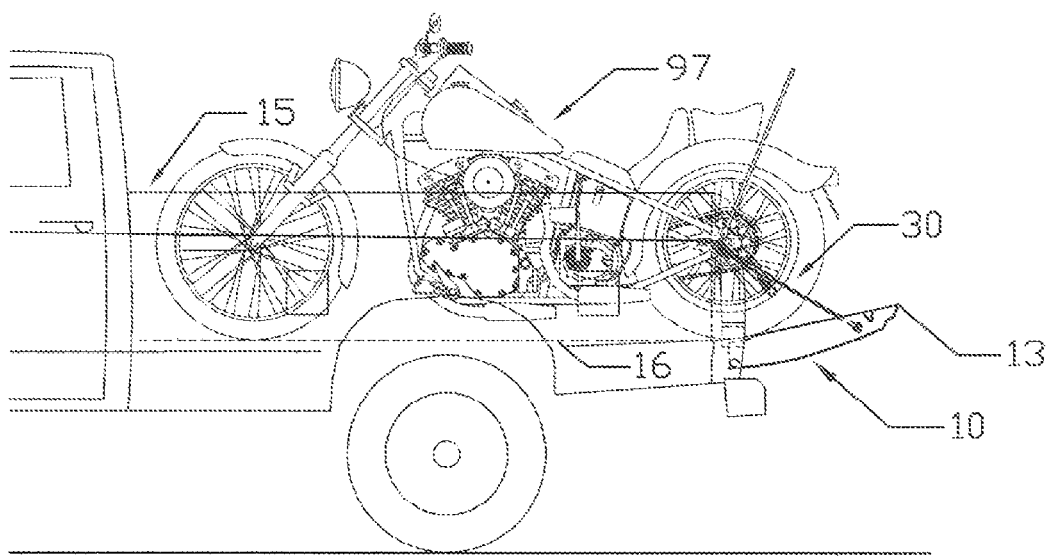
FIG. 23 is a schematic diagram illustrating a tailgate suspended, by a tailgate support in accordance with the present invention, above a conventional open position to better retain cargo extending longer than the bed of the pickup truck.

Referring to FIGS. 22 through 24, additionally, embodiments in accordance with the present invention allow the height of the leading edge 13 of the tailgate 10 to be easily adjusted to facilitate moving cargo between the pickup bed floor 16 and loading docks 98 of various heights. They may also facilitate securement of cargo 96 (e.g., motorcycles 97 or lumber) that is longer than the vehicle bed 15.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method for positioning a tailgate of a vehicle, the method comprising:
    selecting a vehicle comprising
        a first side, second side, tailgate, and first tailgate support,
        the tailgate connected to pivot with respect to the first and second sides through a range of motion, and
        the first tailgate support comprising a base, an array, and a pivot, the pivot pivotably connecting the array to the base, the base engaging the tailgate, the array engaging the first side and comprising a first engagement mechanism and a second engagement mechanism;
    disengaging the first engagement mechanism from the first side;
    pivoting, after the disengaging, the array with respect to the base; and
    effecting, after the pivoting, an engagement between the second engagement mechanism and the first side.

2. The method of claim 1, wherein the selecting comprises selecting the vehicle having a first distance separating the pivot from the first engagement mechanism.

3. The method of claim 2, wherein the selecting comprises selecting the vehicle having a second distance, distinct from the first distance, separating the pivot from the second engagement mechanism.

4. The method of claim 3, wherein the selecting comprises selecting the vehicle having the first distance less than the second distance.

5. The method of claim 4, wherein the selecting comprises selecting the vehicle having the array further comprising a third engagement mechanism.

6. The method of claim 5, wherein the selecting comprises selecting the vehicle having a third distance, distinct from each of the first and second distances, separating the pivot from the third engagement mechanism.

7. The method of claim 1, wherein the selecting comprises selecting the vehicle having the array comprising a pivot aperture.

8. The method of claim 7, wherein the selecting comprises selecting the vehicle having the base comprising at least one pivot aperture.

9. The method of claim 8, wherein the selecting comprises selecting the vehicle having the pivot comprising a pin extending simultaneously through the pivot aperture of the array and the at least one pivot aperture of the base.

10. The method of claim 9, wherein the selecting comprises selecting the vehicle having the at least one pivot aperture of the base comprising a first pivot aperture and a second pivot aperture.

11. The method of claim 10, further comprising removing the pin from both the pivot aperture of the array and the first pivot aperture of the base.

12. The method of claim 11, further comprising aligning the pivot aperture of the array with the second pivot aperture of the base to form a composite aperture.

13. The method of claim 12, further comprising inserting the pin within the composite aperture.

14. The method of claim 13, further comprising locking the pin within the composite aperture.

15. The method of claim 14, wherein the selecting comprises selecting the vehicle having the array comprising a third engagement mechanism.

16. A method for positioning a tailgate of a vehicle, the method comprising:
selecting a vehicle comprising
a first side, second side, tailgate, and first tailgate support,
the tailgate connected to pivot with respect to the first and second sides through a range of motion, and
the first tailgate support comprising a first end connected to the first side and a second end connected to the tailgate;
disconnecting the first tailgate support from the rest of the vehicle;
procuring a second tailgate support comprising a base, an array, and a pivot, the pivot pivotably connecting the array to the base, the array comprising a first engagement mechanism and a second engagement mechanism;
installing, after the disconnecting, the second tailgate support by connecting the base to the tailgate and effecting engagement between the first engagement mechanism and the first side;
disengaging, after the installing, the first engagement mechanism from the first side;
pivoting, after the disengaging, the array with respect to the base; and
effecting, after the pivoting, an engagement between the second engagement mechanism and the first side.

17. A vehicle comprising:
a first side comprising an extension;
a second side;
a tailgate connected to pivot with respect to the first and second sides through a range of motion;
a tailgate support comprising a base, an array comprising a first engagement mechanism and a second engagement mechanism, and a pivot pivotably connecting the array to the base; and
the tailgate support further comprising
the base connected to the tailgate,
the first and second engagement mechanisms each comprising an aperture shaped to receive the extension therewithin,
the aperture of the first engagement mechanism receiving the extension therewithin,
the pivot being spaced from the first engagement mechanism by a first distance, and
the pivot being spaced from the second engagement mechanism by a second distance, distinct from the first distance.

18. The vehicle of claim 17, wherein:
the array comprises a pivot aperture;
the base comprises a plurality of pivot apertures; and
the pivot comprises a pin extending simultaneously through the pivot aperture of the array and a pivot aperture of the plurality of pivot apertures of the base.

19. The method of claim 18, wherein:
the array further comprises a third engagement mechanism; and
the pivot is spaced from the third engagement mechanism by a third distance, distinct from each of the first and second distances.

* * * * *